P. Klepper,

Egg-Beater,

N° 66,855.    Patented July 16, 1867.

Witnesses:
Geo. F. Southern
Gustav Berg

Inventor,
P. Klepper
pr
Van Santvoord & Hauff
Attys

United States Patent Office.

P. KLEPPER, OF CENTRALIA, ILLINOIS.

Letters Patent No. 66,855, dated July 16, 1867.

IMPROVED EGG-BEATER.

The Schedule referred to in these Letters Patent and making part of the same.

TO ALL WHOM IT MAY CONCERN:

Be it known that I, P. KLEPPER, of Centralia, in the county of Marion, and in the State of Illinois, have invented a new and useful Improved Egg-Beater; and I do hereby declare that the following is a full, clear, and exact description thereof, which will enable those skilled in the art to make and use the same, reference being had to the accompanying drawing, forming part of this specification, in which drawing—

Similar letters indicate corresponding parts.

Figure 1:
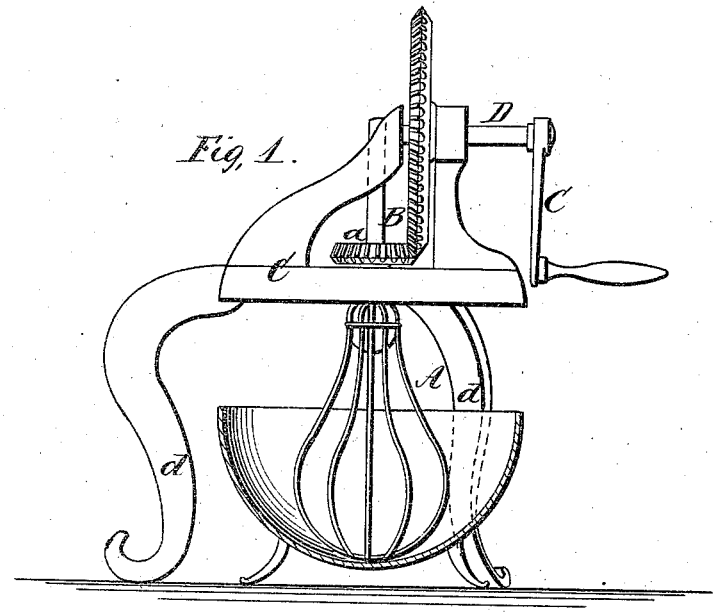
Figure 1 represents a sectional side elevation of this invention.
Figure 2:
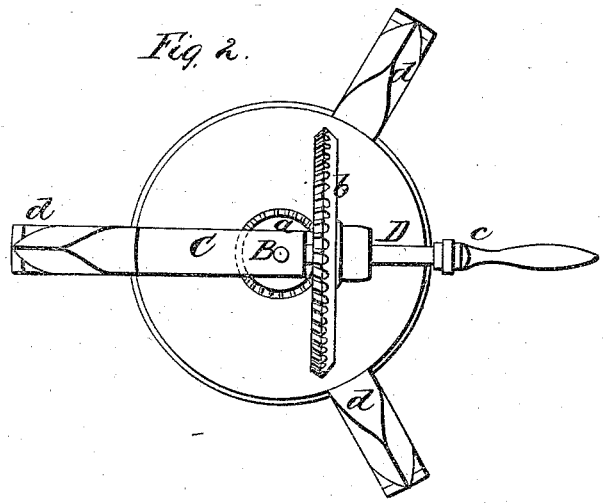
Figure 2 is a plan or top view of the same.

This invention relates to an egg-beater, which is secured to a shaft, to which a rapid revolving motion can be imparted by suitable gear-wheels, and which has its bearings in a stand supported by legs in such a manner that, by placing the stand on a table, the beater can be readily adjusted in the proper position in relation to the dish or vessel containing the eggs to be beaten, and the operation of beating eggs can be performed with ease and facility, the necessity of holding either the dish or the beater in the hand being avoided.

A represents my egg-beater, which is constructed of a series of curved wires or of any other suitable material in the required form or shape. This egg-beater is secured to the lower end of a vertical shaft, B, which has its bearings in a stand, C, of cast iron or any other suitable material, and to which a rapid revolving motion can be imparted by a bevel-gear, $a\,b$, and crank, $c$, the bevel-pinion $a$ being secured to the shaft C, and the bevel-wheel $b$ to a horizontal shaft, D, to which is also secured the crank $c$. The shaft D has its bearings in two standards, which rise from the stand C, and which may be cast solid with or otherwise attached to the same. The stand C is supported by legs $d$, which are curved and of such a height that, when said stand is placed upon a table, a dish or other vessel containing the eggs to be beaten can be conveniently put under it, and that, when said vessel is put in the proper position, the beater A will extend down close to its bottom without touching the same. If the vessel should be too high, the stand must be raised by placing small pieces of wood or other material under its legs, and if the vessel should be too low, so that the distance between its bottom and the beater should be greater than desirable, it can easily be raised by placing it upon a piece of board or other material of suitable thickness. By these means an egg-beater is obtained which can be easily operated even by a child, since neither the beater nor the vessel has to be held in the hand, and the operation of beating eggs is materially facilitated.

What I claim as new, and desire to secure by Letters Patent, is—

The arrangement of the beater A, in combination with the stand C, supported by legs $d$, substantially as and for the purpose described.

P. KLEPPER.

Witnesses:
HENRY STOCK,
RAYMOND WAEHL.